US010525649B2

(12) United States Patent
Ikai et al.

(10) Patent No.: US 10,525,649 B2
(45) Date of Patent: Jan. 7, 2020

(54) SERVO MOTOR CONTROLLER

(71) Applicant: FANUC CORPORATION, Yamanashi (JP)

(72) Inventors: Satoshi Ikai, Yamanashi (JP); Tsutomu Nakamura, Yamanashi (JP); Tomoyuki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/000,258

(22) Filed: Jun. 5, 2018

(65) Prior Publication Data
US 2019/0001602 A1 Jan. 3, 2019

(30) Foreign Application Priority Data

Jul. 3, 2017 (JP) .................. 2017-130332

(51) Int. Cl.
| | |
|---|---|
| *G05B 19/416* | (2006.01) |
| *B30B 15/00* | (2006.01) |
| *B30B 15/14* | (2006.01) |
| *B21D 24/02* | (2006.01) |
| *B30B 15/02* | (2006.01) |
| *B30B 15/26* | (2006.01) |
| *B21D 24/10* | (2006.01) |

(52) U.S. Cl.
CPC .......... *B30B 15/0094* (2013.01); *B21D 24/02* (2013.01); *B30B 15/02* (2013.01); *B30B 15/148* (2013.01); *B30B 15/26* (2013.01); *G05B 19/416* (2013.01); *B21D 24/10* (2013.01)

(58) Field of Classification Search
None
See application file for complete search history.

(56) References Cited

U.S. PATENT DOCUMENTS 8,042,375 B2 * 10/2011 Suzuki .................. B21D 24/10
72/16.1
10,108,182 B2 * 10/2018 Ueda ....................... H02P 29/20
(Continued)

FOREIGN PATENT DOCUMENTS

| JP | 11-33799 | 2/1999 |
| JP | 2006-7296 | 1/2006 |

(Continued)

*Primary Examiner* — Bickey Dhakal
(74) *Attorney, Agent, or Firm* — Wenderoth, Lind & Ponack, L.L.P.

(57) ABSTRACT

A servo motor controller comprises: a position command generation unit; a position detection unit; a position control unit that generates a velocity command for position control based on a position command and a position FB; a force command generation unit that generates a force command for instructing force to be applied to a subject by a driving target; a force detection unit; a force control unit that generates a velocity command for force control based on the force command and a force FB; a selection unit that selects one of the position control and the force control; and a storage unit that stores a force threshold. The selection unit selects one of the velocity commands for the position control and the force control of a smaller value. If the force FB is smaller than the force threshold, the selection unit selects the velocity command for the position control.

4 Claims, 8 Drawing Sheets

(56) References Cited

U.S. PATENT DOCUMENTS

2003/0214526 A1* 11/2003 Numata .................. G06F 3/016
                                                    715/701
2009/0025444 A1*  1/2009 Suzuki .................. B21D 24/02
                                                     72/16.1

FOREIGN PATENT DOCUMENTS

| JP | 2006-26738  | 2/2006 |
| JP | 4015139     | 9/2007 |
| JP | 2008-12588  | 1/2008 |
| JP | 4357405     | 8/2009 |
| JP | 2009-217627 | 9/2009 |
| JP | 2014-151361 | 8/2014 |

* cited by examiner

SERVO MOTOR CONTROLLER

This application is based on and claims the benefit of priority from Japanese Patent Application No. 2017-130332, filed on 3 Jul. 2017, the content of which is incorporated herein by reference.

BACKGROUND OF THE INVENTION

Field of the Invention

The present invention relates to a servo motor controller that controls a servo motor to drive a driving target, and executes position control for controlling the position of the driving target and force control for controlling force to be applied to the driving target.

Related Art

Forge rolling machines for pressing, forging, bending, rolling, cutting, crimping (riveting), etc. have been known. As such forge rolling machines, there is a machine with a slide (movable unit) having one die and a bolster (fixed unit) having the other die, which controls drive of the slide or a die cushion mechanism at the bolster using a servo motor. Drive of the slide or the die cushion mechanism at the bolster is controlled by the following two methods.

A first method is to control drive of the slide using the servo motor. According to the first method, position control of controlling the position of the slide is executed so as to make the one die approach a subject placed on the other die and contact the subject. After the one die contacts the subject, force control is executed to control force constantly applied to the subject by the slide.

A second method is to move the slide back and force by a predetermined stroke and control drive of the die cushion mechanism at the bolster using the servo motor. According to the second method, position control is executed to place the die cushion mechanism at a standby position until the one die contacts the subject placed on the other die. After the one die contacts the subject, force control is executed to control force constantly applied to the subject by moving the die cushion mechanism and the slide together. Patent documents 1 and 2 describe inventions relating to timing of making a switch from position control to force control in a servo motor controller employing the second method.

The servo motor controller described in patent document 1 compares a velocity command for position control and a velocity command for force control, and selects a velocity command having a smaller value in terms of a direction of pressing the subject as an actual velocity command. By doing so, position control is switched to force control to coincide with timing when the velocity command for force control becomes smaller in value than the velocity command for position control. This achieves a smooth transition from position control to force control.

The servo motor controller described in patent document 2 further makes correction of a force command for force control to a smaller value while a velocity command for position control is selected. This makes it possible to set earlier timing for a velocity command for force control (error between a force command and a force feedback) to become smaller in value than a velocity command for position control, specifically, to set earlier timing for making a switch from position control to force control. After position control is switched to force control, the corrected force command is restored to an initial value.

Patent Document 1: Japanese Patent No. 4015139
Patent Document 2: Japanese Patent No. 4357405

SUMMARY OF THE INVENTION

The present invention relates to a servo motor controller employing the foregoing first method. If the servo motor controller employing the first method uses the method of selecting a velocity command described in patent document 1, and if a velocity command for force control is smaller in value than a velocity command for position control, the velocity command for force control smaller in value than the velocity command for position control may be selected before the one die contacts the subject. In this case, it takes time for the glide (driving target) to contact the subject. This problem may be solved by selecting the velocity command for position control forcibly until the one die contacts the subject.

It is assumed that the servo motor controller employing the first method uses the method of selecting a velocity command described in patent document 2. In this case, in consideration of the foregoing problem occurring if a velocity command for force control is smaller in value than a velocity command for position control, the velocity command for position control is selected forcibly until the one die contacts the subject. In this case, a force command corrected before contact between the one die and the subject further functions as a force threshold for switching from position control to force control. Until the force threshold (corrected force command) is exceeded, the velocity command for position control is selected forcibly. When the force threshold (corrected force command) is exceeded, the velocity command for position control is switched to an initial force command and force control is executed. However, the force command is restored to the initial value from the corrected value (increasing the force command) after making a switch from position control to force control. Therefore, a velocity command for force control (error between a force command and a force feedback) may increase steeply to cause a mechanical shock. This will be described in detail by referring to FIGS. 1A and 1B.

Referring to FIG. 1A, dashed lines show a force command and solid lines show a force feedback (hereinafter called a force FB). Referring to FIG. 1B, dashed lines show a velocity command Vcmd (position) for position control and a velocity command Vcmd (force) for force control, and solid lines show a selected velocity command Vcmd (selected).

In a period from time t0 to time t1, even if the velocity command Vcmd (force) is smaller in value than the velocity command Vcmd (position), the velocity command Vcmd (position) is selected forcibly to make a slide approach a subject under position control. At this time, a force command is corrected to a smaller value (force threshold). At the time t1, the slide contacts the subject. In a period from the time t1 to time t2, the force FB is increased to reduce the velocity command Vcmd (force) (error between the force command and the force FB). At the time t2, the force FB reaches the force command (force threshold) and the velocity command Vcmd (force) becomes zero. At this time, the velocity command Vcmd (force) is selected instead of the velocity command Vcmd (position) to make a switch from position control to force control. At this time, the corrected force command is restored to an initial value (initial force command value). Thus, the velocity command Vcmd (force) (error between the force command and the force FB), specifically, the selected velocity command Vcmd (selected)

increases from zero steeply. This steep increase in the velocity command may cause a mechanical shock. Then, with increase in the force FB, the velocity command Vcmd (force) (error between the force command and the force FB) is reduced. At time t3, the force FB reaches the force command and the velocity command Vcmd (force) is controlled constantly so as to maintain the force FB at a constant value.

The present invention is intended to provide a servo motor controller that restricts increase in time for a driving target to contact a subject and reduces the occurrence of a mechanical shock during switching of a control system (a control method).

(1) A servo motor controller according to the present invention (servo motor controller 1, 1A, 1B described later, for example) controls a servo motor (servo motor 2 described later, for example) to drive a driving target (slide (driving target) 3 described later, for example) and executes position control for controlling the position of the driving target and force control for controlling force to be applied to a subject (rivet (subject) 5 described later, for example) by the driving target. The servo motor controller comprises: a position command generation unit (position command generation unit 10 described later, for example) that generates a position command for instructing the position of the driving target; a position detection unit (position detection unit 12 described later, for example) that detects the position of the driving target; a position control unit (position control unit 14 described later, for example) that generates a velocity command for the servo motor for the position control based on the position command generated by the position command generation unit and the position detected by the position detection unit; a force command generation unit (force command generation unit 20 described later, for example) that generates a force command for instructing force to be applied to the subject by the driving target; a force detection unit (force detection unit 22 described later, for example) that detects force applied to the subject by the driving target; a force control unit (force control unit 24 described later, for example) that generates a velocity command for the servo motor for the force control based on the force command generated by the force command generation unit and the force detected by the force detection unit; a selection unit (selection unit 40 described later, for example) that selects one of the position control and the force control; and a storage unit (storage unit 30 described later, for example) that stores a force threshold for selection by the selection unit. The selection unit compares the velocity command for the position control generated by the position control unit and the velocity command for the force control generated by the force control unit, and selects one of the velocity commands of a smaller value. If the force detected by the force detection unit is smaller than the force threshold, the selection unit selects the velocity command for the position control independently of a result of the comparison.

(2) The servo motor controller described in (1) may further comprise: a velocity control unit (velocity control unit 50 described later, for example) that generates a torque command for the servo motor based on the velocity command selected by the selection unit; and a filter (filter 45 described later, for example) provided at a stage preceding and/or subsequent to the velocity control unit. When the selection unit makes a switch from the position control to the force control, the filter may smoothen change from the velocity command for the position control to the velocity command for the force control and/or change in a torque command responsive to change to the velocity command.

(3) In the servo motor controller described in (2), the filter may include a first order low-pass filter.

(4) The servo motor controller described in (1) may further comprise: a velocity control unit (velocity control unit 50B described later, for example) that generates a torque command for the servo motor based on the velocity command selected by the selection unit. The velocity control unit includes an integrator. A function used by the integrator changes value of the integrator in such a manner that the torque command becomes a continuous torque command when the selection unit makes a switch from the position control to the force control.

The present invention is capable of providing a servo motor controller that restricts increase in time for a driving target to contact a subject and reduces the occurrence of a mechanical shock during switching of a control system (a control method).

DETAILED DESCRIPTION OF THE INVENTION

Figure 1A:
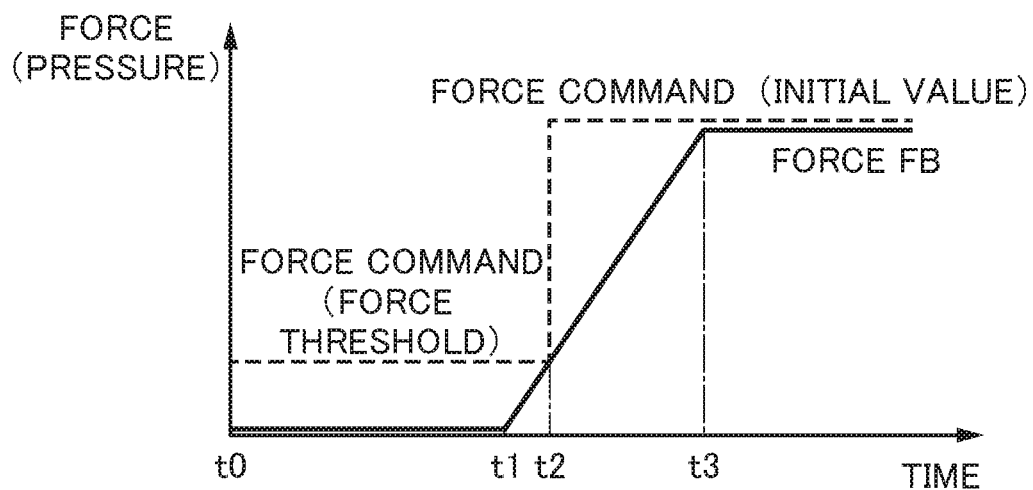
FIG. 1A shows the waveform of each element in a conventional servo motor controller.

Examples of an embodiment of the present invention will be described below by referring to the accompanying drawings. In the drawings, comparable or corresponding elements are given by the same sign.

First Embodiment

Figure 2:
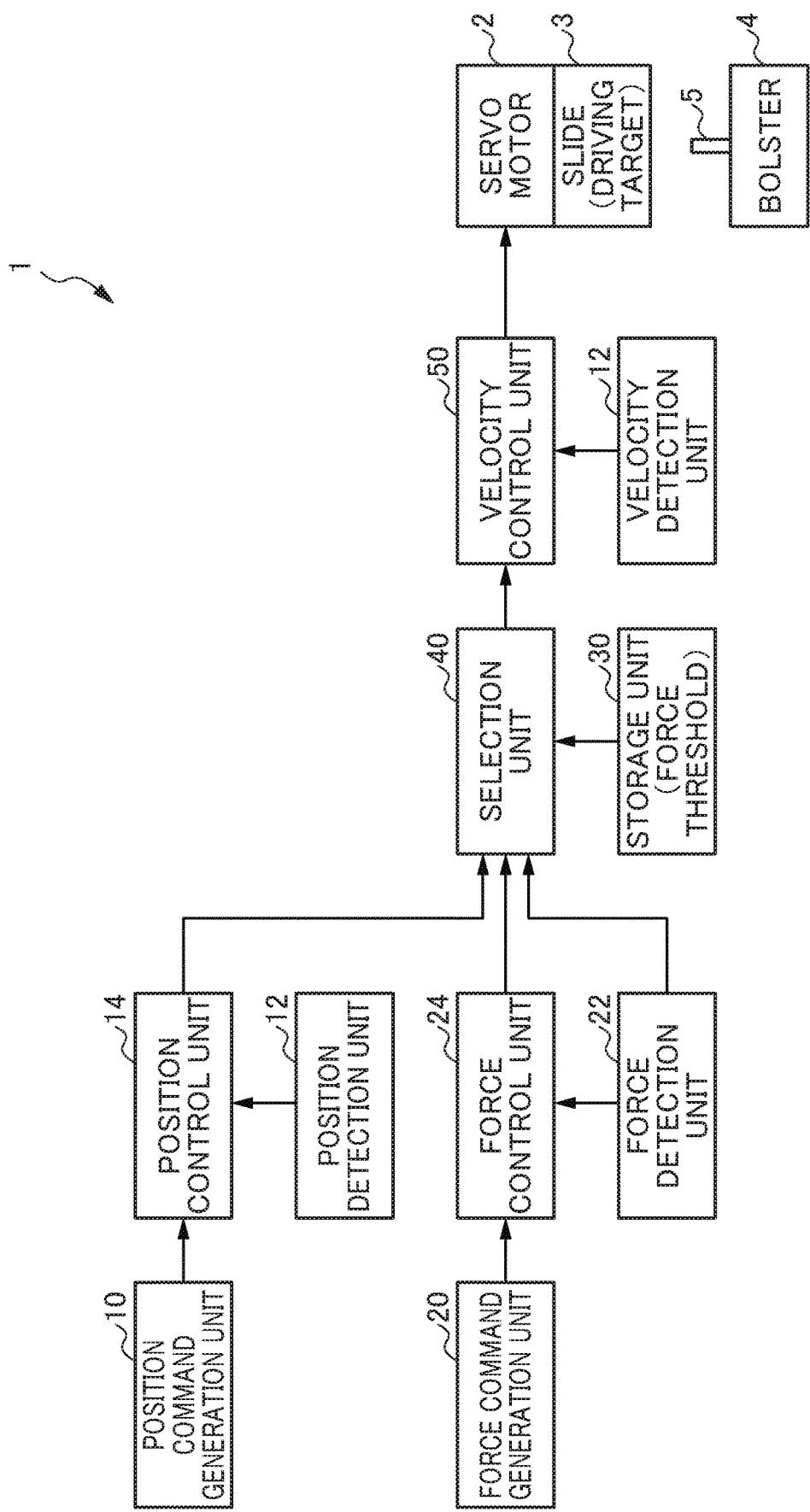
FIG. 2 shows the configuration of a servo motor controller according to a first embodiment.
Figure 3:
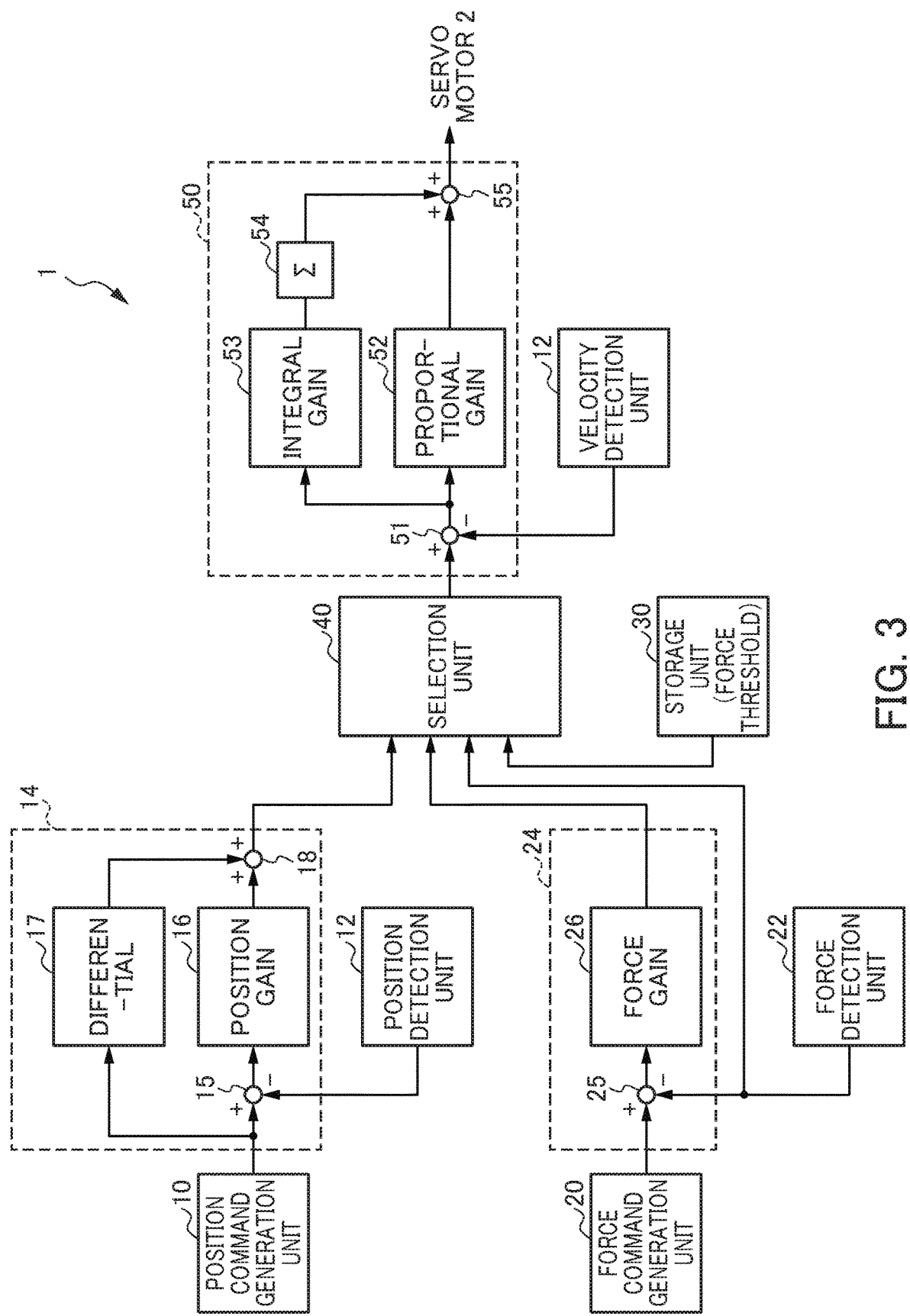
FIG. 3 shows the configuration of the servo motor controller in detail according to the first embodiment.

FIG. 2 shows the configuration of a servo motor controller according to a first embodiment. FIG. 3 shows the configuration of the servo motor controller in detail according to the first embodiment. As shown in FIG. 2, a servo motor controller 1 controls a servo motor 2 in a rivet crimping machine, for example.

The rivet crimping machine is a device for crimping two metal plates together with a rivet, for example. In the rivet crimping machine, a slide (movable unit) 3 is moved relative to a bolster (fixed unit) 4 to hold a rivet 5 with the slide 3 and the holster 4 and generate force applied to the rivet 5, thereby deforming the rivet 5.

The servo motor controller 1 controls the servo motor 2 to drive the slide (hereinafter called a driving target) 3. For this control, the servo motor controller 1 executes two controls: position control of controlling the position of the driving target 3; and force control of controlling force (pressure) to be applied to the rivet (hereinafter called a subject) 5 by the driving target 3 (first method described above).

As shown in FIGS. 2 and 3, the servo motor controller 1 includes a position command generation unit 10, a position detection unit (velocity detection unit) 12, a position control unit 14, a force command generation unit 20, a force detection unit 22, a force control unit 24, a storage unit 30, a selection unit 40, and a velocity control unit 50.

The position command generation unit 10 generates a position command (position command for position control) for instructing the position of the driving target 3. The position command generation unit 10 generates a position command for the driving target 3 by following a program or an order input from a host controller or an external input device not shown in the drawings, for example.

The position detection unit 12 is an encoder provided at the servo motor 2, for example. The position detection unit 12 detects the rotational position of the servo motor 2. The rotational position of the servo motor 2 corresponds to the position of the driving target 3. Thus, the position detection unit 12 is to detect the position of the driving target 3. The detected position is used as a position feedback (position FB). The position detection unit 12 also functions as a velocity detector and detects the rotational velocity of the servo motor 2. The rotational velocity of the servo motor 2 corresponds to the velocity of the driving target 3. Thus, the position detection unit 12 is to detect the velocity of the driving target 3. The detected velocity is used as a velocity feedback (velocity FB).

The position control unit 14 generates a velocity command for the servo motor 2 for position control based on the position command generated by the position command generation unit 10 and the position FB detected by the position detection unit 12. The position control unit 14 includes a subtractor 15, an amplifier 16, a differentiator 17, and an adder 18.

The subtractor 15 determines position error obtained from the position command generated by the position command generation unit 10 and the position FB detected by the position detection unit 12. The amplifier 16 multiplies the position error determined by the subtractor 15 by a position gain. The differentiator 17 differentiates the position command generated by the position command generation unit 10. The adder 18 adds a feedback value from the amplifier 16 and a feed forward value from the differentiator 17, thereby generating a velocity command for position control.

The force command generation unit 20 generates a force command (force command for force control) for instructing force (pressure) to be applied to the subject 5 by the driving target 3. The force command generation unit 20 generates a force command for the driving target 3 by following a program or an order input from a host controller or an external input device not shown in the drawings, for example.

The force detection unit 22 is a pressure sensor provided at the driving target 3, for example. The force detection unit 22 detects force (pressure) applied to the subject 5 by the driving target 3. The detected force is used as a force feedback (force FB).

The force control unit 24 generates a velocity command for the servo motor 2 for force control based on the force command generated by the force command generation unit 20 and the force FB detected by the force detection unit 22. The force control unit 24 includes a subtractor 25 and an amplifier 26.

The subtractor 25 determines force error obtained from the force command generated by the force command generation unit 20 and the force FB detected by the force detection unit 22. The amplifier 26 multiplies the force error determined by the subtractor 25 by a force gain, thereby generating a velocity command for force control.

The storage unit 30 contains a force threshold stored in advance for selection by the selection unit 40 described later. The storage unit 30 is a rewritable memory such as an EEPROM, for example.

The selection unit 40 selects one of position control and force control, thereby making a switch between position control and force control. More specifically, the selection unit 40 compares the velocity command for position control generated by the position control unit 14 and the velocity command for force control generated by the force control unit 24, and selects one of the velocity commands of a smaller value. At this time, if the force FB detected by the force detection unit 22 is smaller than the force threshold stored in the storage unit 30, the selection unit 40 selects the velocity command for position control independently of a result of the foregoing comparison.

The velocity control unit 50 generates a torque command for the servo motor 2 based on the velocity command selected by the selection unit 40 and the velocity FB detected by the velocity detection unit (position detection unit) 12. The velocity control unit 50 includes a subtractor 51, an amplifier 52, an amplifier 53, an integrator 54, and an adder 55.

The subtractor 51 determines velocity error obtained from the velocity command selected by the selection unit 40 and the velocity FB detected by the position detection unit 12. The amplifier 52 multiplies the velocity error determined by the subtractor 51 by a proportional gain. The amplifier 53 multiplies the velocity error determined by the subtractor 51 by an integral gain. The integrator 54 integrates an output value from the amplifier 53. The adder 55 adds an output value from the amplifier 52 and an output value from the integrator 54, thereby generating a torque command.

The servo motor controller 1 (also, a servo motor controller 1A and a servo motor controller 1B described later) is configured using an arithmetic processor such as a digital signal processor (DSP) or an field-programmable gate array (FPGA), for example. Various functions (position command generation unit 10, position control unit 14, force command generation unit 20, force control unit 24, selection unit 40, velocity control unit 50, and velocity control unit 50B and filter 45 described later) of the servo motor controller 1 (the servo motor controllers 1A and 1B) are realized by execution of predetermined software (program) stored in the storage unit 30, for example. Various functions of the servo motor controller 1 may be realized by cooperation between hardware and software, or only by hardware (electronic circuit).

Figure 4:
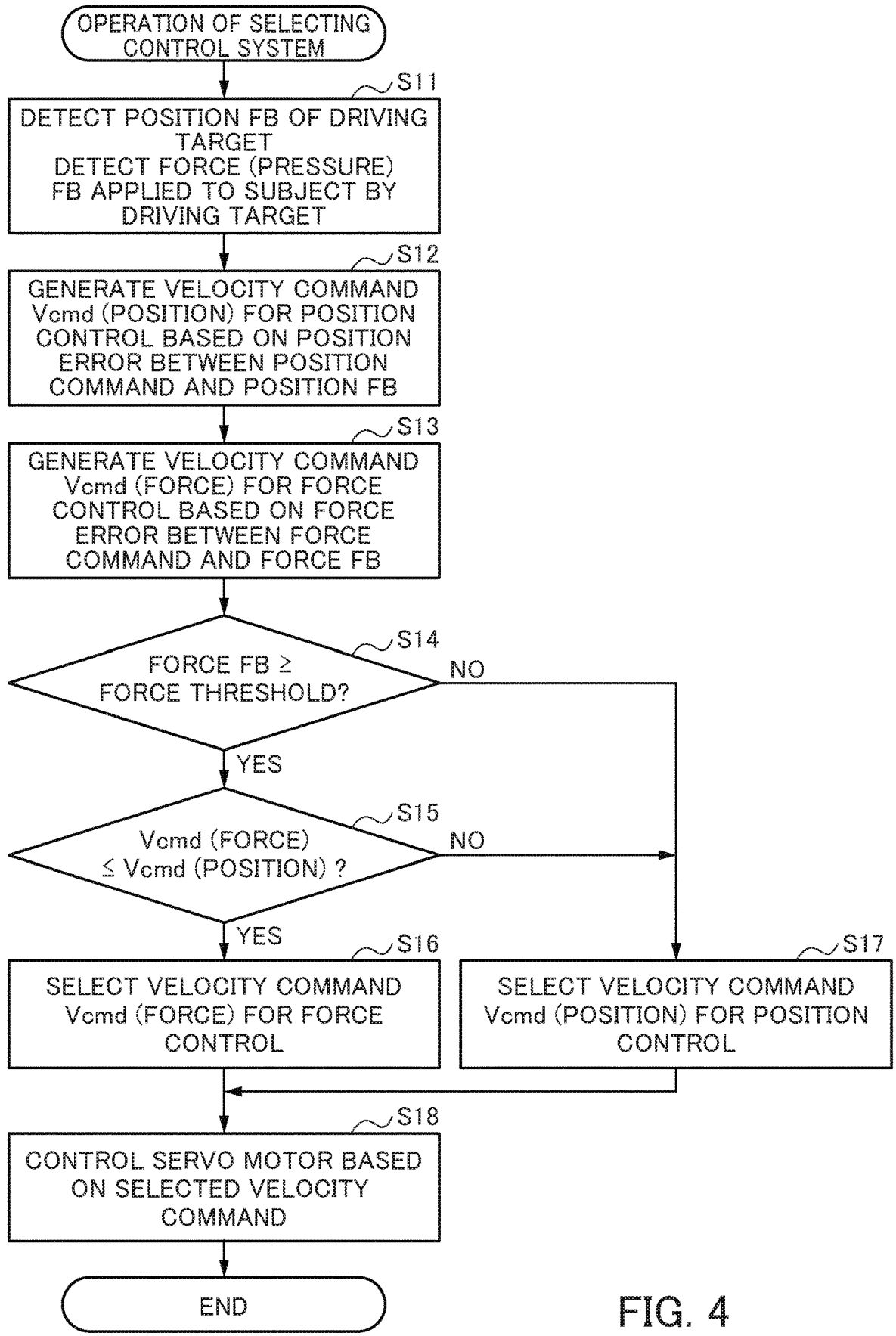
FIG. 4 is a flowchart showing operation of selecting a control system by the servo motor controller according to the first embodiment.

Operation of selecting a control system (a control method) by the servo motor controller 1 of the first embodiment will be described next by referring to FIG. 4. FIG. 4 is a flowchart showing the operation of selecting a control system by the servo motor controller 1 of the first embodiment.

First, the position detection unit 12 detects the rotational position of the servo motor 2, specifically, the position FB of the driving target 3 (S11). Further, the force detection unit 22 detects the force FB applied to the subject 5 by the driving target 3 (S11).

Next, the position control unit 14 generates a velocity command Vcmd (position) for position control based on position error obtained from a position command generated by the position command generation unit 10 and the position FB (S12). Then, the force control unit 24 generates a velocity command. Vcmd (force) for force control based on force error obtained from a force command generated by the force command generation unit 20 and the force FB (S13).

Next, the selection unit 40 determines whether the force FB is equal to or larger than a force threshold (S14). If the force FB is equal to or larger than the force threshold (YES in S14), the selection unit 40 determines whether the velocity command Vcmd (force) for force control is equal to or smaller in value than the velocity command Vcmd (position) for position control (S15). If the velocity command Vcmd (force) is equal to or smaller in value than the velocity command Vcmd (position) (YES in S15), the selection unit 40 selects the velocity command Vcmd (force) for force control (S16).

If the force FB is determined to be smaller than the force threshold in step S14 (NO in S14), or if the velocity command Vcmd (force) is determined to be larger in value than the velocity command Vcmd (position) in step S15 (NO in S15), the selection unit 40 selects the velocity command Vcmd (position) for position control (S17).

In this way, the selection unit 40 compares the velocity command Vcmd (position) for position control and the velocity command Vcmd (force) for force control, and selects one of the velocity commands of a smaller value (If YES in S15, then S16, or if NO in S15, then S17). If the force FB is smaller than the force threshold, the selection unit 40 selects the velocity command Vcmd (position) for position control independently of a result of the foregoing comparison (if NO in S14, then S17).

Next, the velocity control unit 50 generates a torque command based on velocity error obtained from the selected velocity command and the velocity FB detected by the velocity detection unit (position detection unit) 12, and feeds the servo motor 2 with the generated torque command.

Figure 5A:
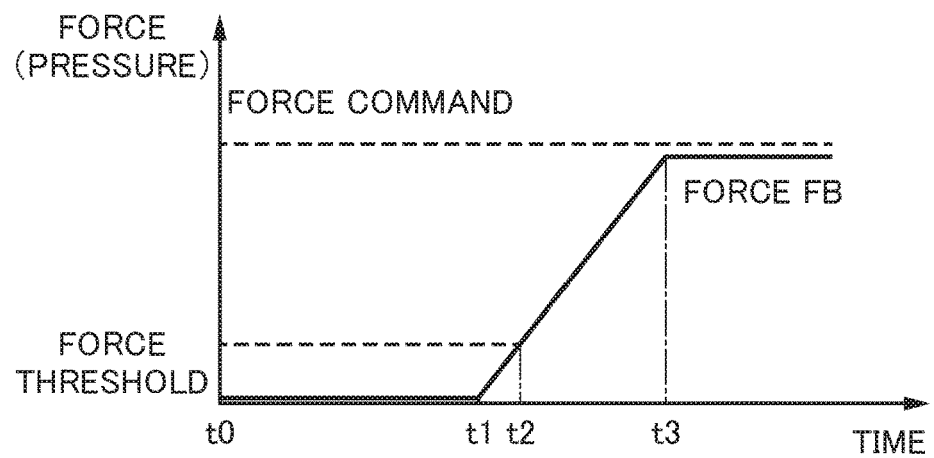
FIG. 5A shows the waveform of each element in the servo motor controller according to the first embodiment.
Figure 5B:
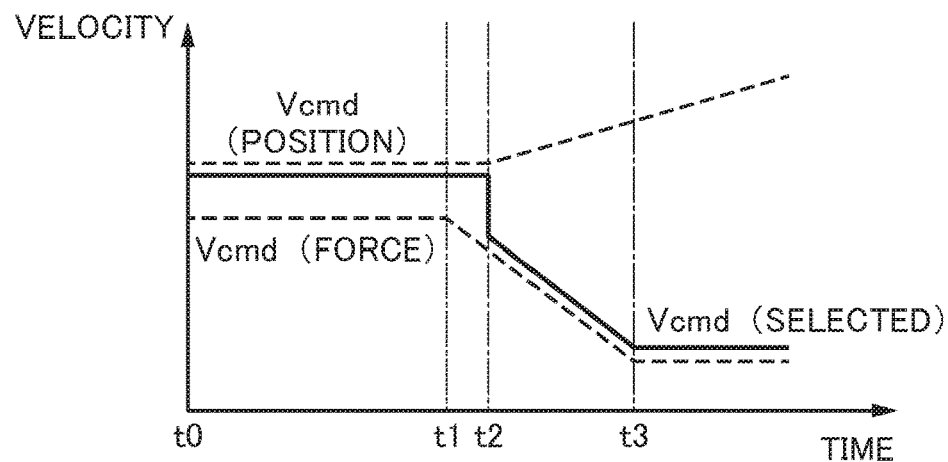
FIG. 5B shows the waveform of each element in the servo motor controller according to the first embodiment.
Figure 5C:
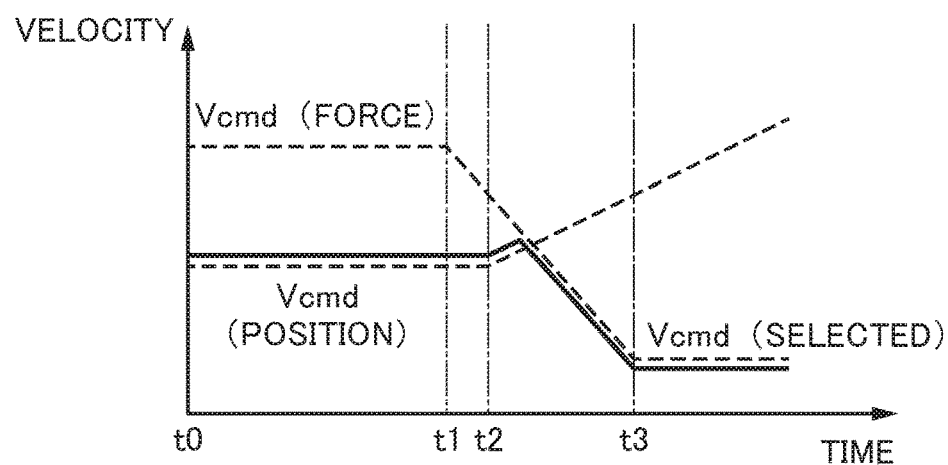
FIG. 5C shows the waveform of each element in the servo motor controller according to the first embodiment.

The operation of selecting a control system. (a control method) by the servo motor controller 1 of the first embodiment will be described in more detail next by referring to FIGS. 5A to 5C. FIGS. 5A to 5C each show the waveform of each element in the servo motor controller 1 of the first embodiment. Referring to FIG. 5A, dashed lines show a force command and solid lines show the force FB. Referring to FIGS. 5B and 5C, dashed lines show the velocity command Vcmd (position) for position control and the velocity command Vcmd (force) for force control, and solid lines show a selected velocity command Vcmd (selected). FIG. 5B shows the waveform of each element determined if the velocity command Vcmd (force) for force control is smaller in value than the velocity command Vcmd (position) for position control. FIG. 5C shows the waveform of each element determined if the velocity command Vcmd (force) for force control is larger in value than the velocity command Vcmd (position) for position control.

In a period from time t0 to time t1, the force FB is equal to zero. Thus, the selection unit 40 selects the velocity command Vcmd (position) for position control independently of a result of the comparison in step S15 (NO in S14, then S17). This makes the driving target 3 approach the subject 5 under position control.

Here, Vcmd (position) and Vcmd (force) are expressed as follows:

Vcmd (position)=(position command−position FB)×position gain+position FF

Vcmd (force)=(force command−force FB)×force gain

Figure 1B:
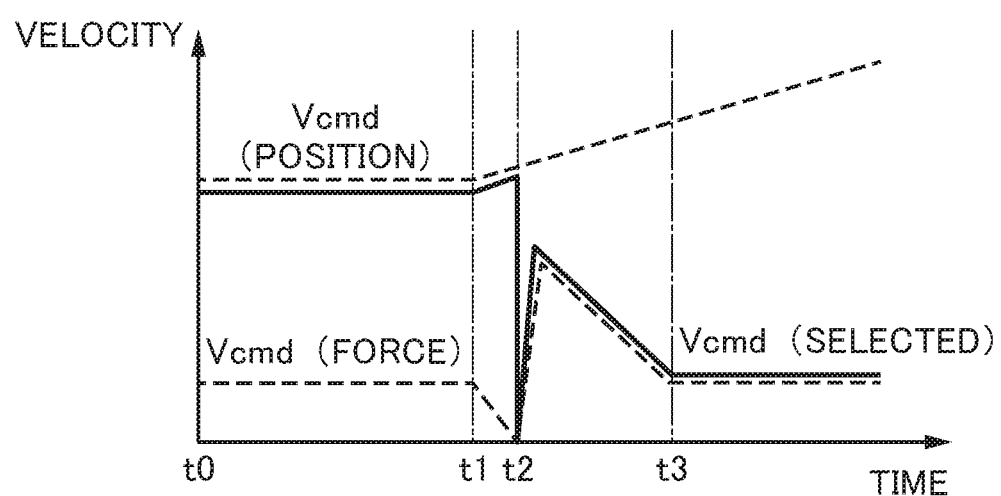
FIG. 1B shows the waveform of each element in the conventional servo motor controller.

Position FF=feed forward obtained by the differentiator 17. In some cases, it becomes impossible to set a high force gain depending on the rigidity of a device or that of the subject 5. In such cases, Vcmd (force) may be reduced to be smaller in value than Vcmd (position), as shown in FIG. 5B. In this case, if the selection unit 40 selects a velocity command for force control smaller in value than a velocity command for position control, it takes time for the driving target 3 to contact the subject 5. In this regard, while the force FB is smaller than the force threshold, the selection unit 40 of this embodiment selects the velocity command for position control independently of a result of comparison between the velocity commands. This makes it possible to restrict increase in time for the driving target 3 to contact the subject 5. This embodiment differs from the configuration shown in FIGS. 1A and 1B in that the force command and the force threshold are considered separately and the force command is maintained at an initial value, and that the velocity command Vcmd (position) is selected forcibly until the force FB reaches the force threshold.

When the driving target 3 contacts the subject 5 at the time t1, the force FB is increased and the velocity command Vcmd (force) (error between the force command and the force FB) is reduced in a period from the time t1 to time t2.

When the force FB reaches the force threshold at the time t2 (YES in S14), the selection unit 40 selects one of the velocity command Vcmd (position) for position control and the velocity command Vcmd (force) for force control of a smaller value. As shown in FIG. 5B, if the velocity command Vcmd (force) is equal to or smaller in value than the velocity command Vcmd (position) (YES in S15), the selection unit 40 selects the velocity command Vcmd (force) instead of the velocity command Vcmd (position). By doing so, position control is switched to force control. At this time, a difference between the velocity command Vcmd (position) and the velocity command Vcmd (force) is small, so that change to the selected velocity command Vcmd (selected) is small. This makes it possible to reduce the occurrence of a mechanical shock during switching of a control system (a control method). If a rivet (subject) is to be deformed in a rivet crimping machine, for example, it is important to apply constant force to the rivet to flatten the rivet uniformly. If a shock occurs during switching, however, it may become impossible to flatten the rivet uniformly. By contrast, the occurrence of a mechanical shock during switching of a control system (a control method) can be reduced in this embodiment, so that the rivet can be flattened uniformly. With subsequent increase in the force FB, the velocity command Vcmd (force) (error between the force command and the force FB) is reduced. The force FB reaches the force command at time t3 and then the velocity command Vcmd (force) is controlled constantly so as to maintain the force FB at a constant value.

As shown in FIG. 5C, if the velocity command Vcmd (force) is larger in value than the velocity command Vcmd (position) (NO in S15), the selection unit 40 continues selecting the velocity command Vcmd (position) for position control (S17). When the velocity command Vcmd (force) becomes equal to or smaller in value than the velocity command Vcmd (position) (YES in S15), the selection unit 40 selects the velocity command Vcmd (force) instead of the velocity command Vcmd (position). In this case, position control is switched continuously to force control.

To return the driving target 3 to an initial position, action reverse to that shown in FIGS. 5A to 5C is taken.

As described above, in the servo motor controller 1 of this embodiment, the selection unit 40 compares a velocity command for position control and a velocity command for force control, and selects one of the velocity commands of a smaller value. Further, if the force FB is smaller than the force threshold, the selection unit 40 selects the velocity command for position control independently of a result of the comparison between the velocity commands. By doing so, the velocity command for force control smaller in value than the velocity command for position control is not selected before the driving target 3 contacts the subject. This makes it possible to restrict increase in time for the driving target 3 to contact the subject 5. If the velocity command for force control is equal to or smaller in value than the velocity command for position control, the velocity command for position control is switched to the velocity command for force control when the force FB becomes equal to or larger than the force threshold, specifically, while a difference between the velocity command for force control and the velocity command for position control is small. This makes it possible to reduce the occurrence of a mechanical shock during switching of a control system.

Second Embodiment

A second embodiment is intended to reduce the occurrence of a mechanical shock further during switching from position control to force control.

Figure 6:
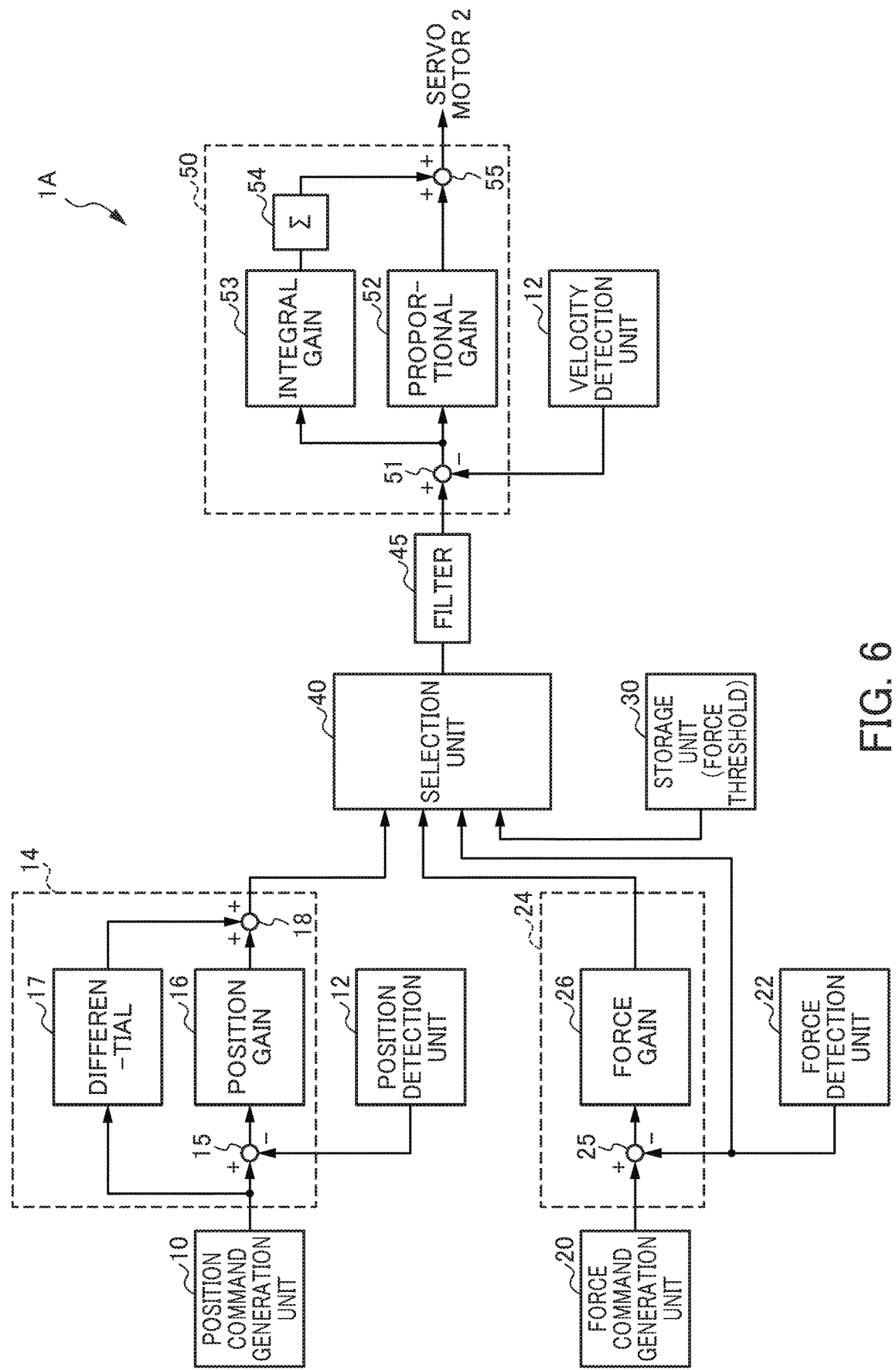
FIG. 6 shows the configuration of a servo motor controller according to a second embodiment.

FIG. 6 shows the configuration of a servo motor controller according to the second embodiment. The configuration of a servo motor controller 1A shown in FIG. 6 differs from that of the servo motor controller 1 of the first embodiment shown in FIG. 3 in that it further includes a filter 45.

The filter 45 is provided at a stage preceding the velocity control unit 50, specifically, between the selection unit 40 and the velocity control unit 50. The filter 45 includes a first order low-pass filter. The filter 45 is configured so as to cause an input signal to pass through the low-pass filter when the selection unit 40 makes a switch from position control to force control, and cause an input signal to bypass the low-pass filter in other cases. By doing so, when the selection unit 40 makes a switch from position control to force control, the filter 45 smoothens change from a velocity command for position control to a velocity command for force control (time t2 in FIG. 5B).

Figure 7:
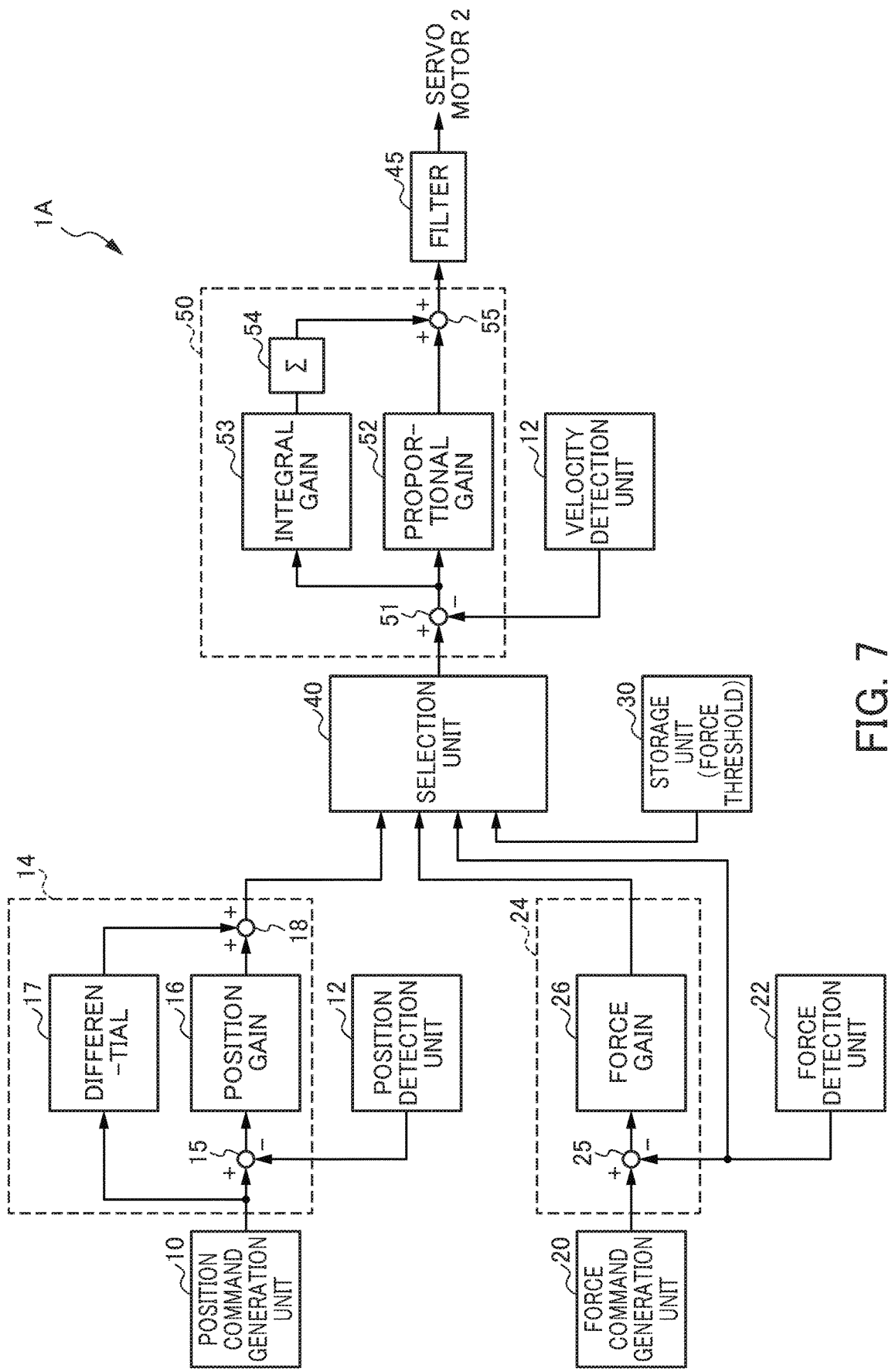
FIG. 7 shows the configuration of a servo motor controller according to a modification of the second embodiment.

As shown in FIG. 7, the filter 45 may be provided at a stage subsequent to the velocity control unit 50. In this case, when the selection unit 40 makes a switch from position control to force control, the filter 45 smoothens change in a torque command responsive to change from a velocity command for position control to a velocity command for force control (time t2 in FIG. 5B).

The servo motor controller 1A of the second embodiment has advantages comparable to those of the servo motor controller 1 of the first embodiment.

Additionally, the servo motor controller 1A of the second embodiment is capable of reducing change further from a velocity command for position control to a velocity command for force control, making it possible to reduce the occurrence of a mechanical shock further during switching of a control system (a control method).

Third Embodiment

A third embodiment is a different configuration intended to reduce the occurrence of a mechanical shock further during switching from position control to force control.

Figure 8:
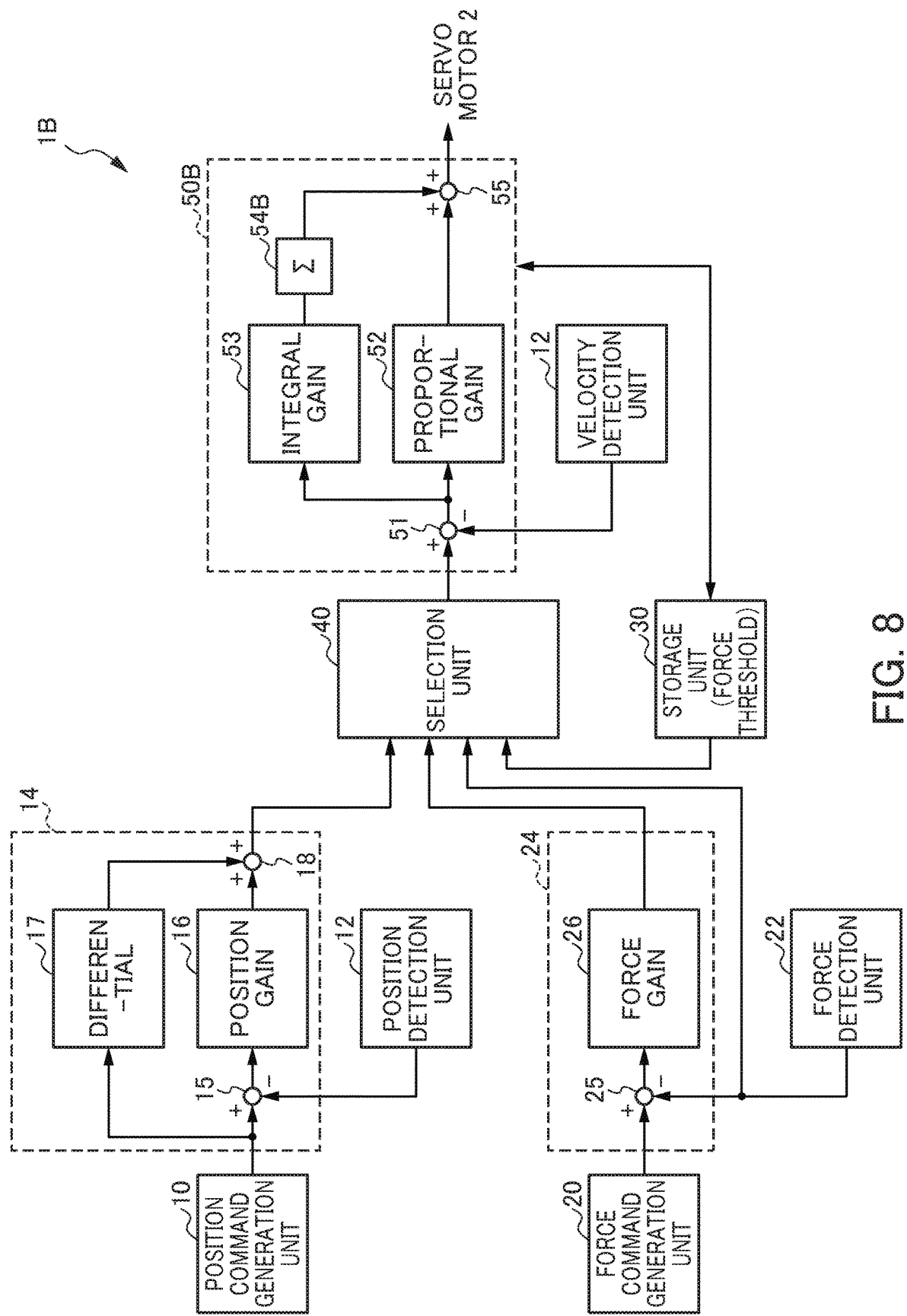
FIG. 8 shows the configuration of a servo motor controller according to a third embodiment.

FIG. 8 shows the configuration of a servo motor controller according to the third embodiment. The configuration of a servo motor controller 1B shown in FIG. 8 differs from that of the servo motor controller 1 of the first embodiment shown in FIG. 5 in that it includes a velocity control unit 50B instead of the velocity control unit 50.

The velocity control unit 50B further includes an integrator 54B instead of the integrator 54 in the velocity control unit 50.

The integrator 54B is an integrator capable of changing a function. A function used by the integrator 54B changes value of the integrator 54B so as to generate a continuous torque command when the selection unit 40 makes a switch from position control to force control. If error between a velocity command and the velocity FB is $(V1-V1fb)$ and an output from the integrator 54B is $\Sigma 1$ during position control, and if error between a velocity command and the velocity FB is $(V2-V2fb)$ and an output from the integrator 54B is $\Sigma 2$ during force control, for example, a torque command Tcmd1 during position control and a torque command Tcmd2 during force control are expressed by the following formulas:

$$Tcmd1=(V1-V1fb)\times \text{proportional gain}+\Sigma 1$$

$$Tcmd2=(V2-V2fb)\times \text{proportional gain}+\Sigma 2.$$

During switching from position control to force control, the output $\Sigma 2$ from the integrator 54B may be changed in a manner expressed by the following formula so as to generate a continuous torque command, specifically, so as to satisfy Tcmd2=Tcmd1:

$$\Sigma 2=\{Tcmd1-(V2-V2fb)\times \text{proportional gain}\}.$$

In other words, a function used by the integrator 54B may be changed so as to satisfy the output $\Sigma 2$ expressed by the foregoing formula. A torque command generated by the velocity control unit 50B is stored into a storage device such as the storage unit 30. The integrator 54B may acquire the torque command Tcmd1 during previous position control from the storage device for switching from position control to force control.

The servo motor controller 1B of the third embodiment also has advantages comparable to those of the servo motor controller 1 of the first embodiment.

Additionally, the servo motor controller 1B of the third embodiment is capable of reducing change in a torque command further responsive to change from a velocity command for position control to a velocity command for force control, making it possible to reduce the occurrence of a mechanical shock further during switching of a control system (a control method).

The embodiments of the present invention are described above. However, the present invention is not limited to the embodiments described above. The effects described in the embodiments are merely a list of most preferable effects resulting from the present invention. Effects achieved by the present invention are not limited to those described in the embodiments.

For example, in the foregoing embodiments, a controller for a servo motor to drive a slide (movable unit) (driving target) in a rivet crimping machine is described as an example. However, the characteristics of the present invention are further applicable to controllers for servo motors to drive slides in forge rolling machines for pressing, forging, bending, rolling, cutting, crimping (riveting), etc.

EXPLANATION OF REFERENCE NUMERALS 1, 1A, 1B Servo motor controller
2 Servo motor
3 Slide (driving target)
4 Bolster
5 Rivet (subject)
10 Position command generation unit
12 Position detection unit (velocity detection unit)
14 Position control unit
15 Subtractor
16 Amplifier
17 Differentiator
18 Adder
20 Force command generation unit
22 Force detection unit
24 Force control unit
25 Subtractor
26 Amplifier
30 Storage unit
40 Selection unit
45 Filter
50, 50B velocity control unit
51 Subtractor
52, 53 Amplifier
54, 54B Integrator
55 Adder

What is claimed is:

1. A servo motor controller that controls a servo motor to drive a driving target and executes position control for controlling the position of the driving target and force control for controlling force to be applied to a subject by the driving target, the servo motor controller comprising:
   a position command generation unit that generates a position command for instructing the position of the driving target;
   a position detection unit that detects the position of the driving target;
   a position control unit that generates a velocity command for the servo motor for the position control based on the position command generated by the position command generation unit and the position detected by the position detection unit;
   a force command generation unit that generates a force command for instructing force to be applied to the subject by the driving target;
   a force detection unit that detects force applied to the subject by the driving target;
   a force control unit that generates a velocity command for the servo motor for the force control based on the force command generated by the force command generation unit and the force detected by the force detection unit;
   a selection unit that selects one of the position control and the force control; and
   a storage unit that stores a force threshold for selection by the selection unit, wherein
   the selection unit compares the velocity command for the position control generated by the position control unit and the velocity command for the force control generated by the force control unit, and selects one of the velocity commands of a smaller value, and
   if the force detected by the force detection unit is smaller than the force threshold, the selection unit selects the velocity command for the position control independently of a result of the comparison.

2. The servo motor controller according to claim 1, further comprising: a velocity control unit that generates a torque command for the servo motor based on the velocity command selected by the selection unit; and
   a filter provided at a stage preceding or subsequent to the velocity control unit, wherein
   when the selection unit makes a switch from the position control to the force control, the filter smoothens change from the velocity command for the position control to the velocity command for the force control and/or change in a torque command responsive to change to the velocity command.

3. The servo motor controller according to claim 2, wherein the filter includes a first order low-pass filter.

4. The servo motor controller according to claim 1, further comprising a velocity control unit that generates a torque command for the servo motor based on the velocity command selected by the selection unit, wherein
   the velocity control unit includes an integrator, and
   a function used by the integrator changes value of the integrator in such a manner that the torque command becomes a continuous torque command when the selection unit makes a switch from the position control to the force control.

* * * * *